(12) United States Patent
Chen

(10) Patent No.: US 8,707,237 B2
(45) Date of Patent: Apr. 22, 2014

(54) METHOD OF INSERTING DUMMY PATTERNS

(71) Applicant: Shanghai Hua Hong NEC Electronics Co., Ltd, Shanghai (CN)

(72) Inventor: Fucheng Chen, Shangahi (CN)

(73) Assignee: Shanghai Hua Hong Nec Electronics Co., Ltd., Shanghai (CN)

( * ) Notice: Subject to any disclaimer, the term of this patent is extended or adjusted under 35 U.S.C. 154(b) by 0 days.

(21) Appl. No.: 13/650,192

(22) Filed: Oct. 12, 2012

(65) Prior Publication Data
US 2013/0097570 A1   Apr. 18, 2013

(30) Foreign Application Priority Data
Oct. 14, 2011   (CN) .......................... 2011 1 0312357

(51) Int. Cl.
*G06F 17/50* (2006.01)
(52) U.S. Cl.
CPC ........ *G06F 17/5068* (2013.01); *G06F 17/5081* (2013.01)
USPC .......................................... 716/123; 716/132

(58) Field of Classification Search
None
See application file for complete search history.

(56) References Cited

U.S. PATENT DOCUMENTS

| | | | |
|---|---|---|---|
| 5,885,856 A * | 3/1999 | Gilbert et al. ................. 438/129 |
| 6,678,879 B1 * | 1/2004 | Hawse et al. ................... 716/52 |
| 7,007,259 B2 * | 2/2006 | Shrowty et al. ............... 716/113 |
| 7,343,580 B2 * | 3/2008 | Zorrilla et al. .................. 716/52 |
| 7,543,262 B2 * | 6/2009 | Wang et al. ................... 716/119 |
| 2009/0282374 A1 * | 11/2009 | Lu et al. ............................ 716/2 |
| 2010/0229139 A1 * | 9/2010 | Kitaoka et al. .................... 716/6 |

* cited by examiner

*Primary Examiner* — Leigh Garbowski
(74) *Attorney, Agent, or Firm* — MKG, LLC

(57) ABSTRACT

A method of inserting dummy patterns is provided. The method includes: determining an applicable area in which dummy patterns shall be inserted and an inapplicable area in which dummy patterns shall not be inserted on a chip; and inserting dummy patterns starting from one side of the inapplicable area and arranging the inserted dummy patterns into circles. The method of the present invention ensures that dummy patters are preferentially inserted around the device that requires protection by dummy patterns, so that good uniformity of chip pattern densities is guaranteed and within-wafer uniformity is improved, thus improving the yield and performance of semiconductor devices.

5 Claims, 7 Drawing Sheets

2nd position    1st position

US 8,707,237 B2

METHOD OF INSERTING DUMMY PATTERNS

CROSS-REFERENCE TO RELATED APPLICATION

This application claims the priority of Chinese patent application number 201110312357.X, filed on Oct. 14, 2011, the entire contents of which are incorporated herein by reference.

TECHNICAL FIELD

The present invention relates to the field of semiconductor integrated circuits manufacturing, and more particularly, to a method of inserting dummy patterns.

BACKGROUND

CMP (Chemical Mechanical Planarization) and dry etching processes widely used in semiconductor integrated circuits manufacturing may cause variations in profiles and patterns of the chips, and therefore may reduce the yield of chips and influence the performance of chips. Thus, it is a common practice that a dummy pattern insertion method be adopted in the CMP and dry etching processes to improve the profiles and patterns of the chips so as to improve within-wafe uniformity.

The most popular dummy pattern insertion method used in the prior art includes the following steps: first, an applicable area in which dummy patterns shall be inserted on a wafer surface is determined based on the relationships between multiple layers of a device. Then dummy patterns are inserted into this applicable area starting from an endpoint of one boundary of the applicable area. The step of inserting dummy patterns continues until the opposite boundary of the applicable area is reached. This method may be affected by the initial position of the first dummy pattern that is inserted. When an inappropriate initial position is selected, the method of inserting dummy patterns may not be carried out successfully. An example will be given as follows.

As shown in FIG. 1, a dummy pattern F is in the shape of a square with a side length of a, and the interval between two dummy patterns is b. A chip D as shown in FIG. 2 may include an inapplicable area B in which dummy patterns shall not be inserted and an applicable area C in which dummy patterns shall be inserted. In this example, the distance between the upper boundary of the inapplicable area B and the upper boundary of the chip D is 2a+b, which is just enough for two dummy patterns F to be inserted. However, whether or not two dummy patterns F can be actually inserted is determined by the initial position of the first dummy pattern to be inserted.

For example, if the initial position A is selected as the left upper corner of the applicable area C, as shown in FIG. 3, two dummy patterns F can be successfully inserted along the vertical direction between the upper boundaries of the inapplicable area B and the chip D. Otherwise, if the initial position A is selected as the left lower corner of the applicable area C, as shown in FIG. 4, problem may arise that two dummy patterns F cannot be successfully inserted along the vertical direction between the upper boundaries of the inapplicable area B and the chip D, leading to failure of inserting dummy patterns at certain areas where dummy patterns are required by the device. In FIG. 3 and FIG. 4, dummy patterns F' that are partly or entirely formed in the inapplicable area B will be removed.

With the increase of the demands on miniaturization and yield of semiconductor devices, the higher and higher within-wafer uniformity is being required. The above dummy pattern insertion method can no longer meet the requirements of the process.

SUMMARY OF THE INVENTION

An objective of the present invention is to provide a method of inserting dummy patterns to improve within-wafer uniformity so as to improve the yield and performance of semiconductor devices.

To achieve the above objective, the present invention provides a method of inserting dummy patterns, which includes the following steps:

step 1) determining an applicable area in which dummy patterns shall be inserted and an inapplicable area in which dummy patterns shall not be inserted on a chip; and step 2) inserting dummy patterns starting from one side of the inapplicable area and arranging the inserted dummy patterns into circles.

According to an embodiment, the chip includes only one inapplicable area, the dummy patterns being equidistantly inserted starting from one side of the inapplicable area.

According to an embodiment, the chip includes two adjacent inapplicable areas and a shortest perpendicular distance is provided between two sides of the inapplicable areas facing each other; if the shortest perpendicular distance can accommodate an even number of dummy patterns, the dummy patterns are inserted starting from the two sides of the inapplicable areas facing each other.

According to an embodiment, the chip includes two adjacent inapplicable areas and a shortest perpendicular distance is provided between two sides of the inapplicable areas facing each other; if the shortest perpendicular distance can accommodate an odd number of dummy patterns, the dummy patterns are inserted starting from the two sides of the inapplicable areas facing each other, and a middle one of the odd number of dummy patterns is arranged on a central line between the two adjacent inapplicable areas.

Preferably, the applicable and inapplicable areas are determined and the dummy patterns are inserted by using an Electronic Design Automation tool.

Compared with the prior art, the method of the present invention starts to insert dummy patterns from a boundary of the inapplicable area and dummy patterns are circlewise inserted around the inapplicable area so as to ensure that dummy patters are preferentially inserted around the device that requires protection by dummy patterns, so that good uniformity of chip pattern densities is guaranteed and within-wafer uniformity is improved, thus improving the yield and performance of semiconductor devices.

BRIEF DESCRIPTION OF THE DRAWINGS

The present invention will be further described and specified by using figures and implementation details as follows.

DETAILED DESCRIPTION

The above objects, features and advantages of the present invention will be more apparent in the course of the following description on embodiments made with reference to accompanying drawings.

Details given in the following description are intended only for a better understanding on the present invention. The present invention can be carried out in other embodiments different with those described below, and those skilled in the art can make various modifications without departing from the spirit or scope of the invention. Thus, the present invention is not limited to the exemplary embodiments as described below.

The method of inserting dummy patterns of the present invention will be described by taking square-shaped dummy patterns as an example. It shall be appreciated that dummy patterns of other shapes can also be inserted by using the method of the present invention. The method includes:

Step 1) An inapplicable area B in which dummy patterns shall not be inserted and an applicable area C in which dummy patterns shall be inserted on a chip D are determined based on the relationships between multiple layers of a semiconductor device. In FIGS. 5A~5C, 6A~6B and 7A~7C, the position relationship of the inapplicable area B and applicable area C is only for the purpose of illustration.

Step 2): Dummy patterns are inserted starting from one side of the inapplicable area and the inserted dummy patterns are arranged into circles.

The method will be further specified in details with the following embodiments.

Embodiment 1

Figure 1:
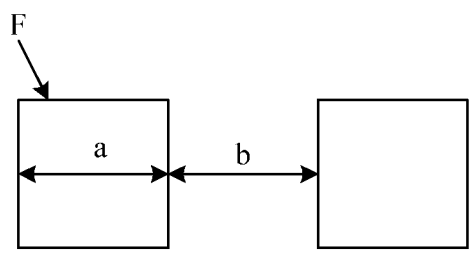
FIG. 1 is a schematic view illustrating the shape of a dummy pattern and the interval between dummy patterns of the prior art.
Figure 2:
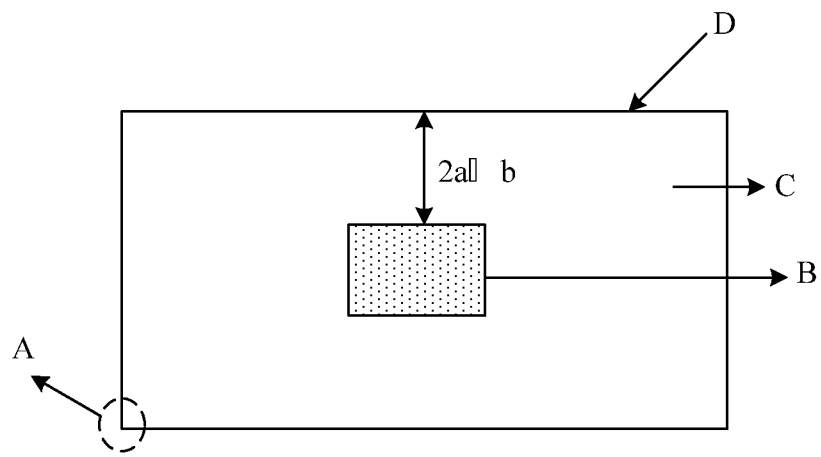
FIG. 2 is a schematic view illustrating a dummy pattern insertion method of the prior art.
Figure 3:
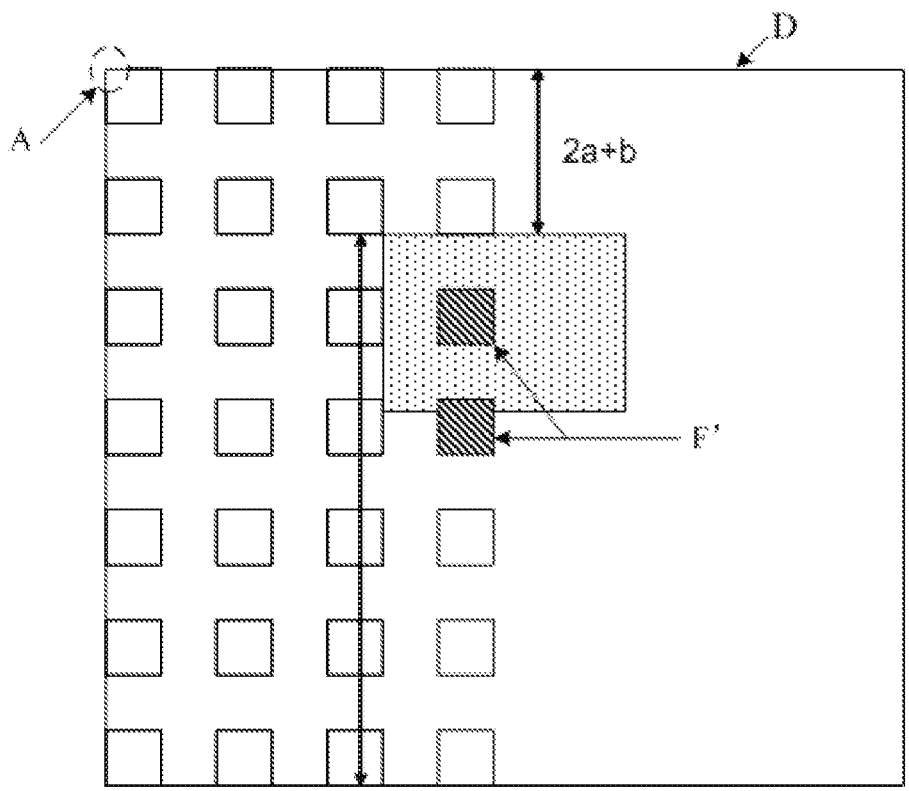
FIG. 3 is a schematic view illustrating dummy patterns being successfully inserted by the dummy pattern insertion method shown in FIG. 2.
Figure 4:
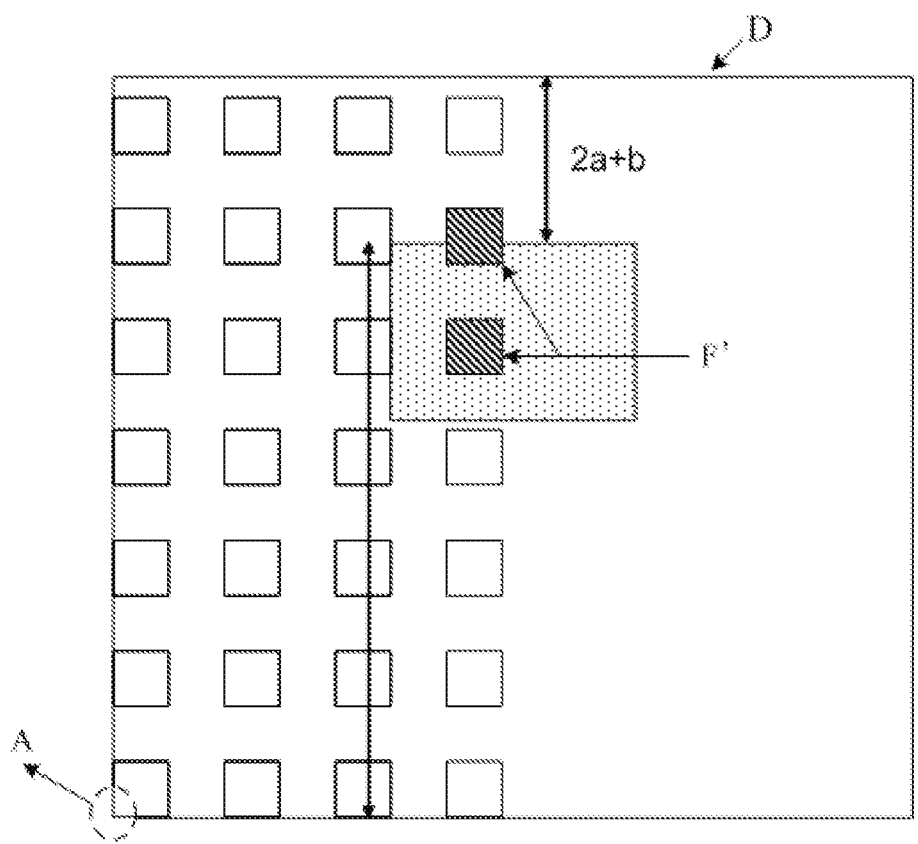
FIG. 4 is a schematic view illustrating dummy patterns being unsuccessfully inserted by the dummy pattern insertion method shown in FIG. 2.
Figure 5A:
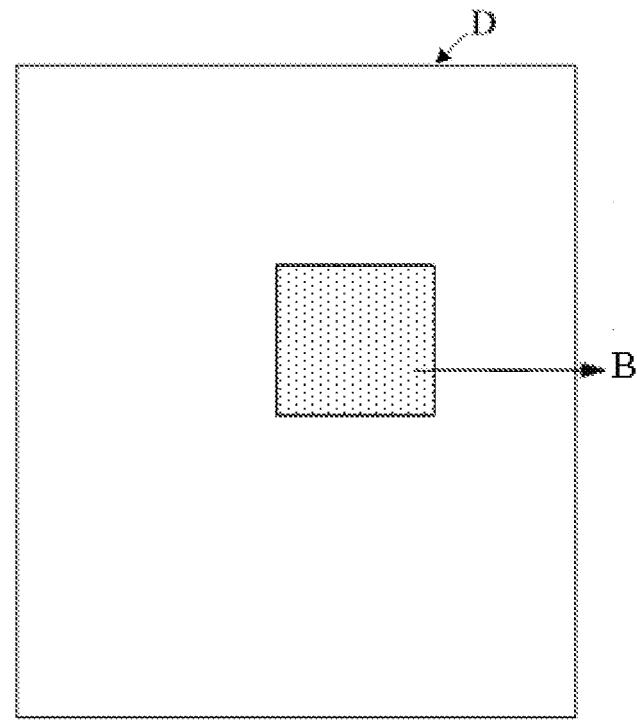
FIGS. 5A to 5C are schematic views illustrating the dummy pattern insertion method according to Embodiment 1 of the present invention.
Figure 5B:
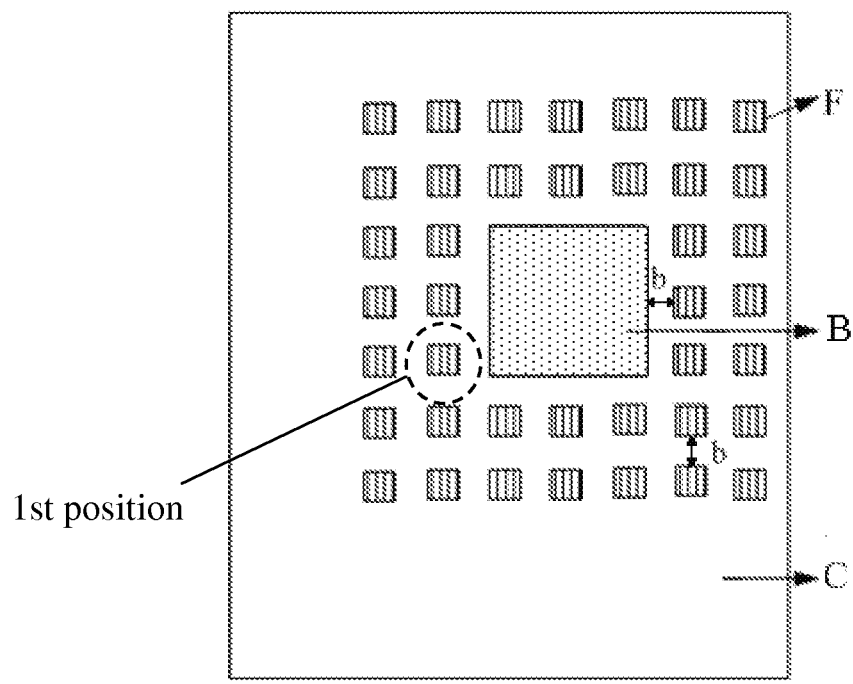
Figure 5C:
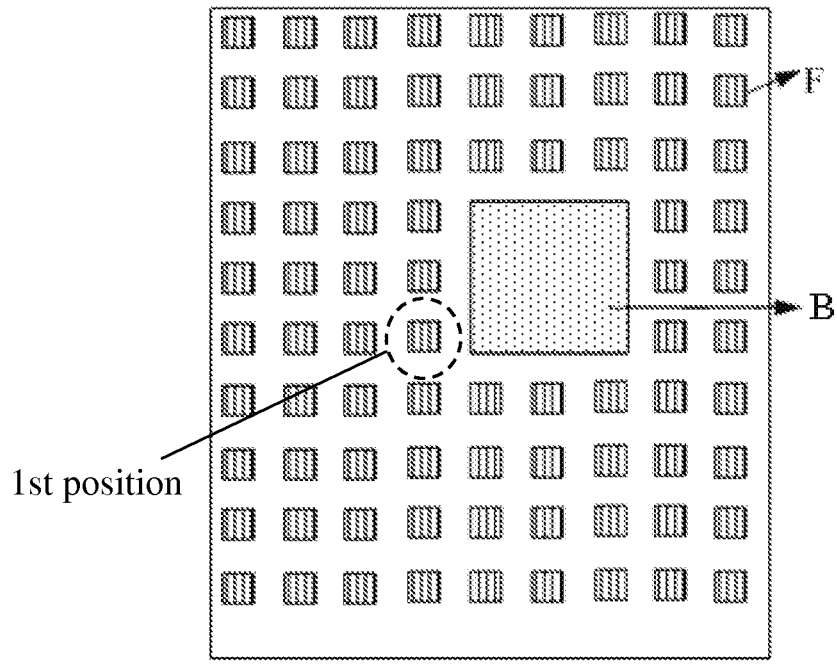

As shown in FIG. 5A, the chip D includes only one inapplicable area B. The dummy patterns F are inserted circlewise and equidistantly with a constant interval b around the inapplicable area B from inside out, starting from at least at a first position in the applicable area C (shown in FIG. 5B). As shown in FIG. 5B, the first position is adjacent to a first side of the inapplicable area B. Specifically, as shown in FIG. 5B, at first, a first circle of dummy patterns is inserted around the inapplicable area B. The interval between each dummy pattern of the first circle and the inapplicable area B is b. Then a second circle of dummy patterns is inserted around the first circle. The interval between the two circles is b. And the interval between every two neighboring dummy patterns F of each circle is also equal to b. After that, insert a third circle, a fourth circle, and so on in a similar way. During the insertion steps, if there is no enough space left on one or more sides of the inapplicable area B for further insertion of dummy patterns, dummy patterns are only inserted on the rest sides of the inapplicable area B until there is no space left on any side of the inapplicable area B for further insertion of dummy patterns. The chip after complete insertion of dummy patterns is shown in FIG. 5C.

Embodiment 2

Figure 6A:
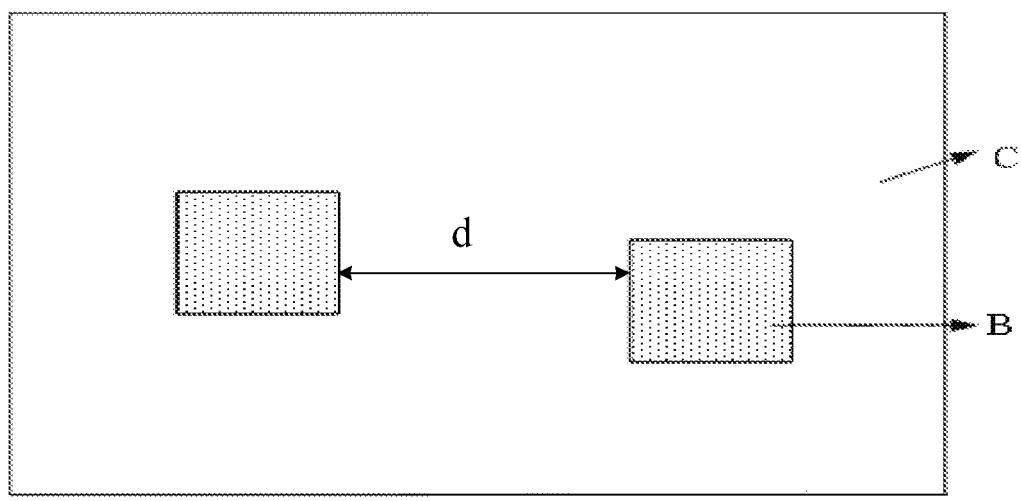
FIGS. 6A to 6B are schematic views illustrating the dummy pattern insertion method according to Embodiment 2 of the present invention.
Figure 7A:
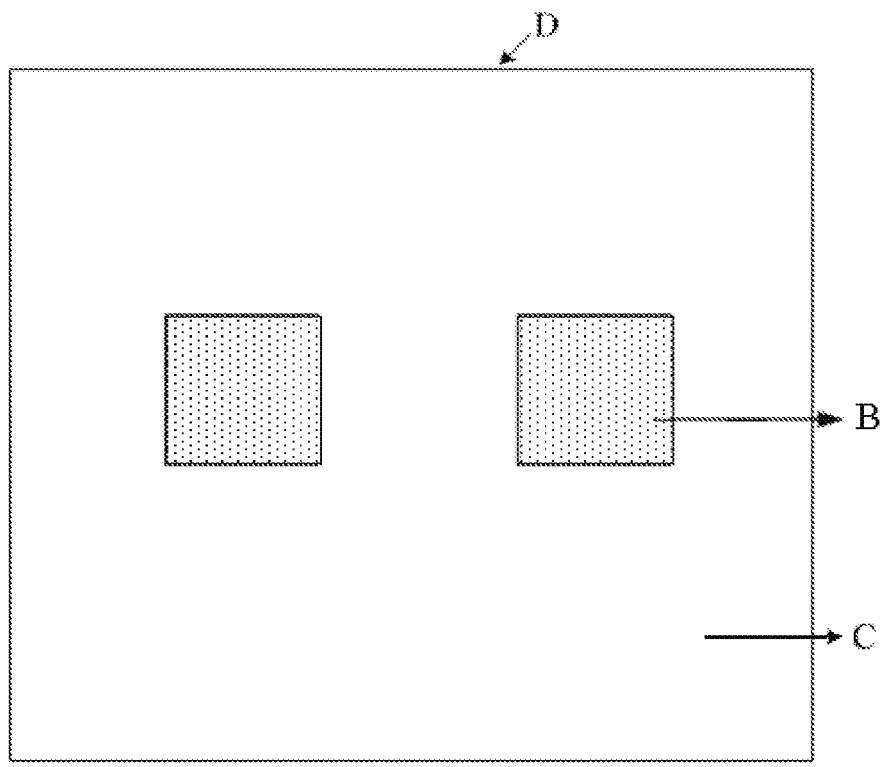
FIGS. 7A to 7C are schematic views illustrating the dummy pattern insertion method according to Embodiment 3 of the present invention.

When the chip D includes two or more inapplicable areas, the position relationship between each two adjacent inapplicable areas could be the one as shown in FIG. 6A that they are not aligned with each other, or in other words, they have different distances to the upper side of the chip D, or the one as shown in FIG. 7A that they are aligned with each other, or in other words, they have an identical distance to the upper side of the chip D.

Figure 6B:
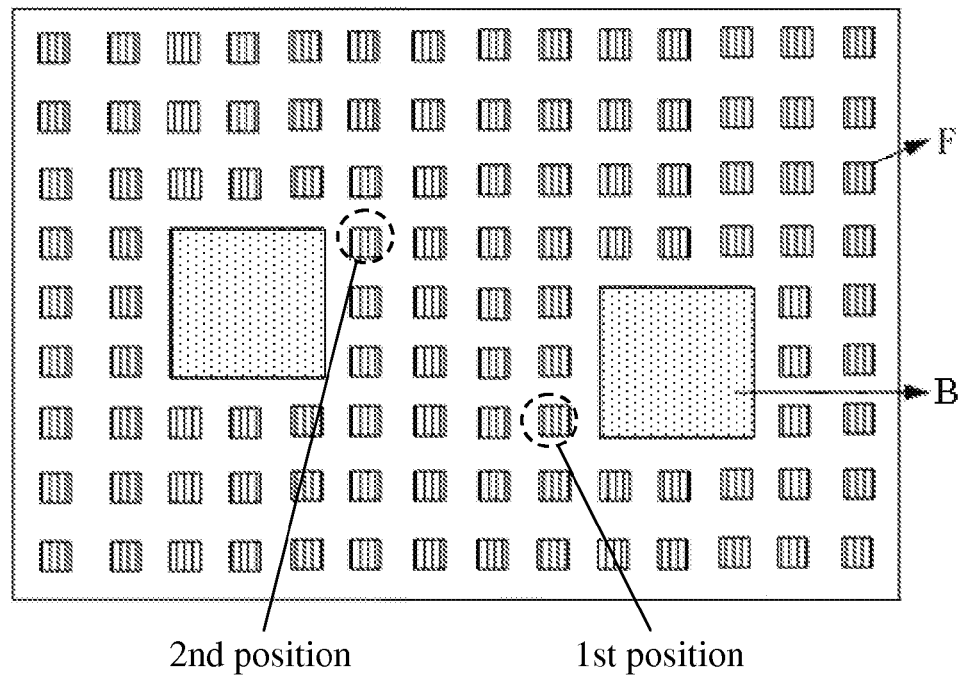

Take the two adjacent inapplicable areas shown in FIG. 6A for example, if the distance d between the two sides of the inapplicable areas facing each other is defined as a shortest perpendicular distance between the inapplicable areas, and if the shortest perpendicular distance can allow an even number of dummy patterns to be inserted, then the dummy patterns are circlewise inserted. As shown in FIG. 6B, a first dummy pattern is inserted starting at the first position in the applicable area C (shown in FIG. 6A) adjacent to the first side of the first inapplicable area B. A second dummy pattern is inserted equidistantly at a constant interval in a circlewise arrangement around the second inapplicable area B starting at a second position in the applicable area C adjacent to the first side of the second inapplicable area. Preferably, the dummy patterns are equidistantly inserted in a similar way as described in Embodiment 1. The chip after complete insertion of dummy patterns is shown in FIG. 6B.

For the case shown in FIG. 7A, where the two adjacent inapplicable areas have an identical distance to the upper side of the chip D, when an even number of dummy patterns can be inserted along the shortest perpendicular distance between two sides of the inapplicable areas facing each other, the dummy patterns may be inserted by using the same method as described above.

Embodiment 3

Figure 7B:
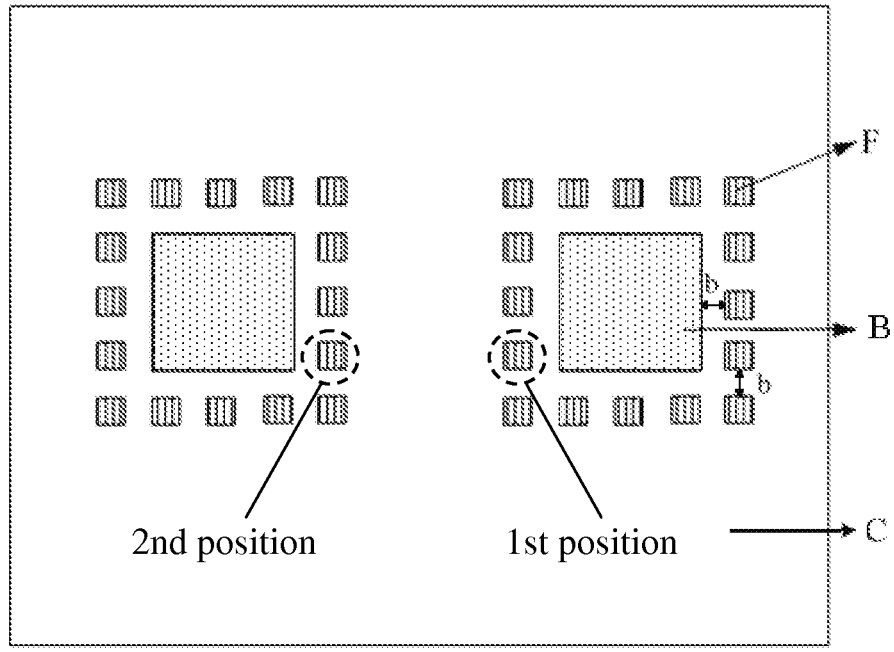

Take the two adjacent inapplicable areas shown in FIG. 7A for example, when the shortest perpendicular distance between the two sides of the inapplicable areas facing each other can allow an odd number of dummy patterns to be inserted, then the dummy patterns are circlewise inserted starting from the two sides of the inapplicable areas facing each other, and the inserted dummy patterns are arranged into circles. As shown in FIG. 7B, a first dummy pattern is inserted equidistantly at a constant interval in a circlewise arrangement around the first inapplicable area B. The first dummy pattern is inserted starting at a first position in the applicable area C adjacent to the first side of the first inapplicable area. A second dummy pattern is inserted equidistantly at a constant interval in a circlewise arrangement around the second inapplicable area B starting at a second point in the applicable area C adjacent to the first side of the second inapplicable area B. Preferably, the dummy patterns are equidistantly inserted as shown in FIG. 7B. Then, repeat the insertion steps until the space left between the two inapplicable areas has a width that can accommodate only one dummy pattern. Afterwards, a last circle of dummy patterns is inserted around each of the two adjacent inapplicable areas, respectively, and the two last circles of dummy patterns shall completely coincide with each other in the space left between the two adjacent inapplicable areas, namely forming only one more column of dummy patterns E between the inapplicable areas, such that a middle one of the odd number of dummy patterns is inserted on the central line between the two adjacent inapplicable areas. The chip after complete insertion of dummy patterns is shown in FIG. 7C, wherein the interval or perpendicular distance between the column of coincided dummy patterns E and the columns next to it is b', while the intervals between every other two neighboring columns or lines remain b, wherein b' may be greater or equal to b.

For the case shown in FIG. 6A, where the two adjacent inapplicable areas have different distances to the upper side of the chip D, when the shortest perpendicular distance between the two adjacent inapplicable areas can accommodate an odd number of dummy patterns, the dummy patterns may be inserted by using the same method as described above.

Figure 7C:
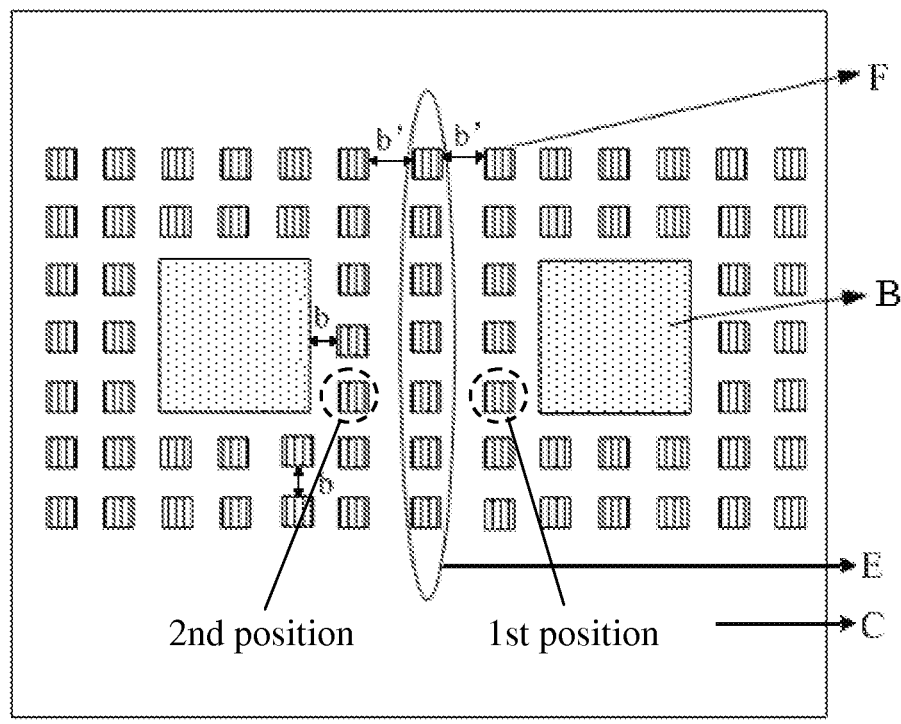

Further, if the chip D includes three or more inapplicable areas, among which two adjacent inapplicable areas have different distances to the upper side of the chip D, when the shortest perpendicular distance between the two adjacent inapplicable areas can accommodate an even number of dummy patterns, the dummy patterns may be inserted by using the method presented in FIG. 6B in Embodiment 2; when the shortest perpendicular distance between the two adjacent inapplicable areas can accommodate an odd number of dummy patterns, the dummy patterns may be inserted by using the method presented in FIG. 7C in Embodiment 3.

Further, if the chip D includes three or more inapplicable areas, among which two adjacent inapplicable areas have an identical distance to the upper side of the chip D, when the shortest perpendicular distance between the two adjacent inapplicable areas can accommodate an even number of dummy patterns, the dummy patterns may be inserted by using the method as presented in FIG. 6B in Embodiment 2; when the shortest perpendicular distance between the two adjacent inapplicable areas can accommodate an odd number of dummy patterns, the dummy patterns may be inserted by using the method as presented in FIG. 7C in Embodiment 3.

The applicable and inapplicable areas are determined and the dummy patterns are inserted by using an EDA (Electronic Design Automation) tool, such as the Calibre DRC (design rule check) tool.

The method of the present invention starts to insert dummy patterns from a boundary of the inapplicable area and dummy patterns are circlewise inserted around the inapplicable area so as to ensure that dummy patters are preferentially inserted around the device that requires protection by dummy patterns, so that good uniformity of chip pattern densities is guaranteed and within-wafer uniformity is improved, thus improving the yield and performance of semiconductor devices.

The above embodiments are provided as examples for the purpose of describing the principle and effects of the invention and are not intended to limit the scope of the invention in any way. It will be apparent to those skilled in the art that various modifications and variations can be made without departing from the spirit or scope of the invention. Thus, it is intended that the present invention covers the modifications and variations of this invention provided they fall within the scope of the following claims and their equivalents.

What is claimed is:

1. A method of inserting dummy patterns in an integrated circuit on a chip to improve within-wafer uniformity, the method comprising:

determining an applicable area of a chip in which dummy patterns shall be inserted;

determining at least one inapplicable area of the chip in which dummy patterns shall not be inserted, each of the at least one inapplicable areas surrounded by the applicable area; and inserting dummy patterns on the chip starting at least at a first position in the applicable area, the first position adjacent to a first side of a first inapplicable area, wherein the dummy patterns are inserted equidistantly at a constant interval in a circlewise arrangement around the first inapplicable area, thereby improving within-wafer uniformity.

2. The method according to claim 1, wherein the chip includes only one inapplicable area.

3. The method according to claim 1, wherein the chip includes two inapplicable areas having a perpendicular distance provided between the first side of the first inapplicable area and a first side of a second inapplicable area, the first side of the first inapplicable area and the first side of the second inapplicable area facing each other;

wherein, if the perpendicular distance can accommodate an even number of dummy patterns, a first dummy pattern is inserted equidistantly at a constant interval in a circlewise arrangement around the first inapplicable area starting at the first position in the applicable area adjacent to the first side of the first inapplicable area, and a second dummy pattern is inserted equidistantly at a constant interval in a circlewise arrangement around the second inapplicable area starting at a second position in the applicable area adjacent to the first side of the second inapplicable area.

4. The method according to claim 1, wherein the chip includes two inapplicable areas having a perpendicular distance provided between the first side of the first inapplicable area and a first side of a second inapplicable area, the first side of the first inapplicable area and the first side of the second inapplicable area facing each other;

wherein, if the shortest perpendicular distance can accommodate an odd number of dummy patterns, a first dummy pattern is inserted equidistantly at a constant interval in a circlewise arrangement around the first inapplicable area starting at the first position in the applicable area adjacent to the first side of the first inapplicable area, a second dummy pattern is inserted equidistantly at a constant interval in a circlewise arrangement around the second inapplicable area starting at a second point in the applicable area adjacent to the first side of the second inapplicable area, and a middle one of the odd number of dummy patterns is inserted arranged on a central line positioned in the applicable area between the first side of the first inapplicable area and the first side of the second inapplicable area.

5. The method according to claim 1, wherein the applicable area and the at least one inapplicable area are each determined by using an Electronic Design Automation Tool and the dummy patterns are inserted by using the Electronic Design Automation tool.

* * * * *